(12) United States Patent
Ibrahim et al.

(10) Patent No.: US 8,082,551 B2
(45) Date of Patent: Dec. 20, 2011

(54) SYSTEM AND METHOD FOR SHARING A TRUSTED PLATFORM MODULE

(75) Inventors: Wael M. Ibrahim, Cypress, TX (US); Valiuddin Y Ali, Cypress, TX (US); Manuel Novoa, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1434 days.

(21) Appl. No.: 11/589,555

(22) Filed: Oct. 30, 2006

(65) Prior Publication Data

US 2008/0189707 A1 Aug. 7, 2008

(51) Int. Cl.
*G06F 9/46* (2006.01)
(52) U.S. Cl. ........................................................ 718/108
(58) Field of Classification Search .................... 718/108
See application file for complete search history.

(56) References Cited

U.S. PATENT DOCUMENTS

| | | | |
|---|---|---|---|
| 5,110,634 A | 5/1992 | Silbermann et al. |
| 5,164,226 A | 11/1992 | Burchill et al. |
| 5,185,191 A | 2/1993 | Silbermann et al. |
| 5,237,045 A | 8/1993 | Burchill et al. |
| 6,116,284 A | 9/2000 | Murray et al. |
| 6,620,342 B1 | 9/2003 | Burchill et al. |
| 2002/0001721 A1 | 1/2002 | Barriere et al. |
| 2002/0136941 A1 | 9/2002 | Bonnet et al. |
| 2004/0139442 A1 | 7/2004 | Miyamoto |

FOREIGN PATENT DOCUMENTS

| | | |
|---|---|---|
| EP | 0 523 878 A | 1/1993 |
| EP | 1 589 399 A1 | 10/2005 |
| JP | 2003507784 | 2/2003 |

OTHER PUBLICATIONS

PCT International Search Report and Written Opinion of the International Searching Authority, having a date of mailing of Jun. 23, 2008, in co-pending PCT International Patent Application No. PCT/US2007/021878 having an International Filing Date of Oct. 11, 2007 with the applicant being Hewlett-Packard Development Company, L.P., and entitled System and Method for Sharing a Trusted Platform Module.

Silberschatz, A., et al.: Operating System Concepts, Passage from Operating System Concepts, Fourth Edition, dated Jan. 1, 1994 pp. I-III, 97-105, 131-145.

TCG: TCG Specification Architecture Overview, Specification Revision 1.2, from the TCG Specification Architecture Overview Trusted Computing Group, US, Apr. 28, 2004, pp. 1-54.

*Primary Examiner* — Meng An
*Assistant Examiner* — Blake Kumabe

(57) ABSTRACT

A system for sharing a trusted platform module (TPM) comprises a TPM operable to execute an operating system (OS)-level process, the TPM operable to pause the execution of the OS-level process and execute a non-OS-level process.

22 Claims, 3 Drawing Sheets

SYSTEM AND METHOD FOR SHARING A TRUSTED PLATFORM MODULE

BACKGROUND

The Trusted Computing Group (TCG) develops and promotes industry standard specifications for hardware-enabled trusted computing and security technologies such as a trusted platform module (TPM). A TPM is used to store and report the integrity of various devices and/or hardware on a computing platform and is used to securely wrap and store platform information and secrets such as passwords, keys and certificates. The TPM is essentially a single command processing device such that while the TPM is operating on data for one process spawned by a computing system, no other process may be operated on by the TPM until the TPM finishes processing the first process. Further, no entity other than the entity that initiated the process which is currently executing on the TPM may establish a connection with the TPM during the execution of that process. Moreover, a single entity usually acts as a scheduler for all processes/entities spawned at the operating system (OS) level desiring to communicate with the TPM. This scheduler entity typically refuses to relinquish control of the TPM during its operation.

Two entities that exclusively use the TPM are the TCG software stack (TSS) and the TPM Basic Services (TBS). The TSS provides security services in accordance with TCG specifications and guidelines and executes within the control of the computer's OS; the TBS virtualizes the TPM for most recent TPM-aware versions of the Windows operating system. However, in some situations, it may be preferable to perform security operations, such as encryption or decryption, outside the control of the OS because a computer system's firmware, which is outside the OS, may be more resistant to interference by user actions, whether negligent or hostile, and is less likely to be altered. Unfortunately, memory available for storing keys and software is typically limited to firmware and the basic input/output system (BIOS), which may be in the firmware. However, if another entity, such as BIOS, firmware, an external device, or another circuit on a computer motherboard, attempts to leverage TPM functionality for security operations, the single-process operational limitation of the TPM introduces the risk of conflicts with the TSS/TBS. Conflicts may take the form of delays and state corruption. Delays occur while the TSS/TBS is using the TPM but will not relinquish control. State corruption could occur if another entity used the TPM between periods of use by the TSS/TBS and changed the state of registers which the TSS/TBS had relied upon to remain unchanged.

DETAILED DESCRIPTION OF THE DRAWINGS

Figure 1:
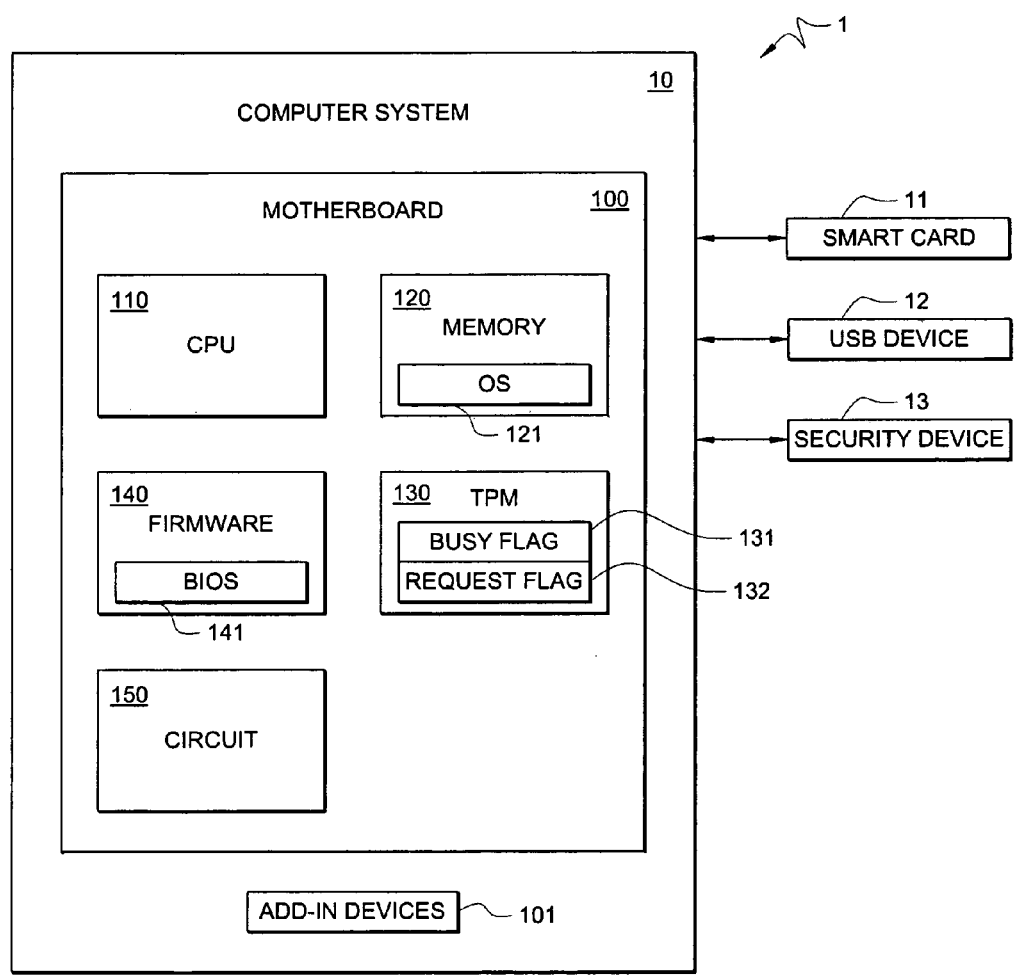
FIG. 1 is a block diagram illustrating an embodiment of a system for sharing a trusted platform module (TPM)
Figure 2:
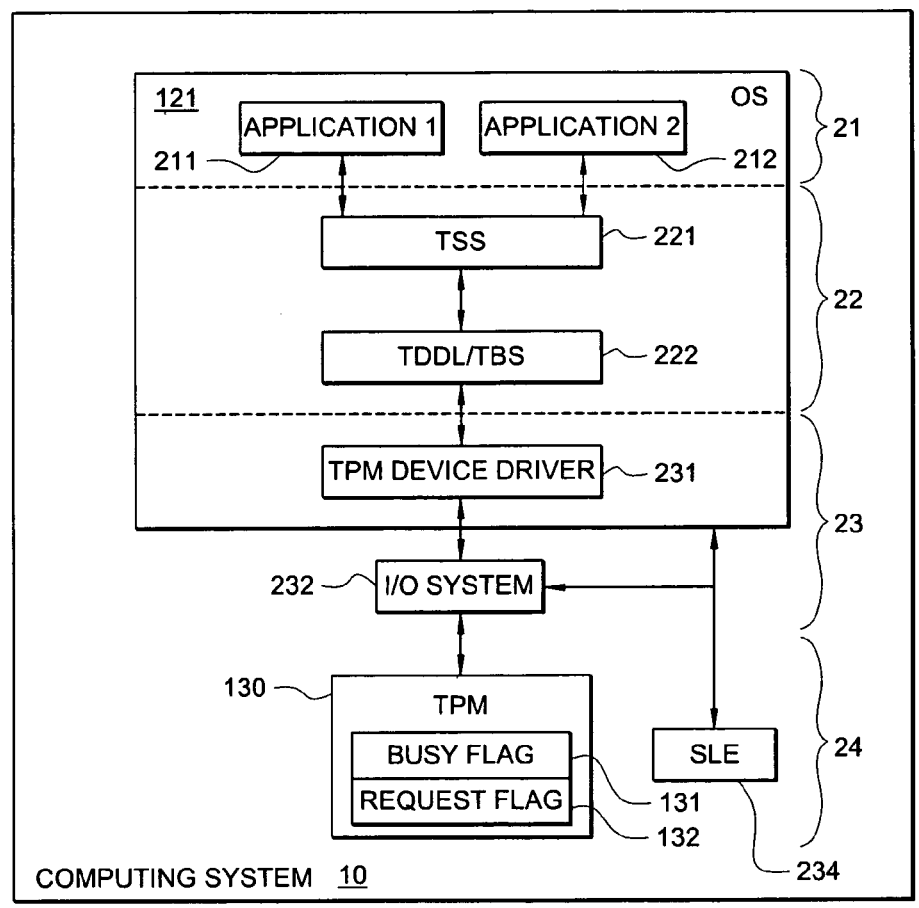
FIG. 2 is a block diagram further illustrating the embodiment of the system for sharing a TPM of FIG. 1.
Figure 3:
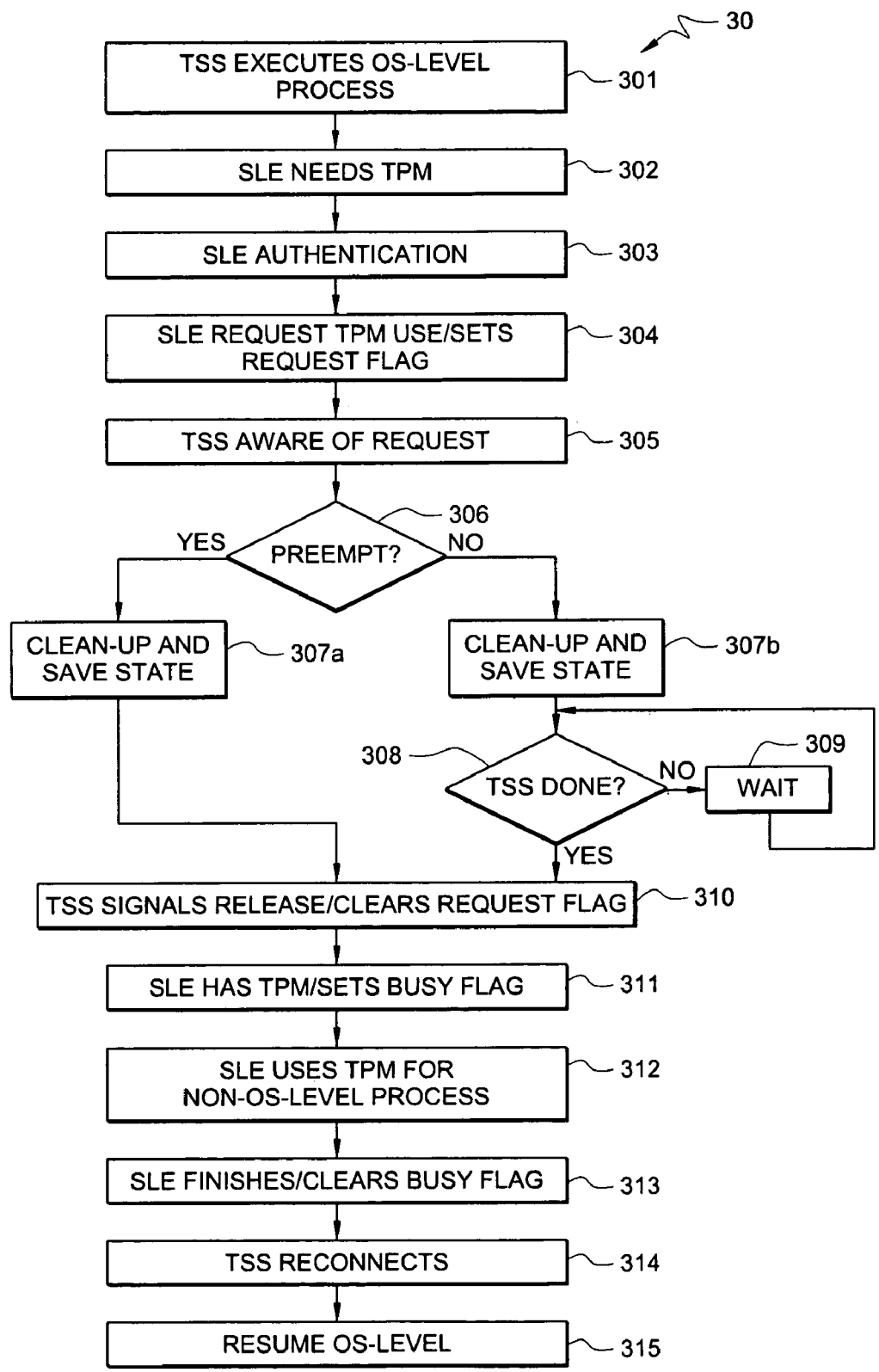
FIG. 3 is a flow diagram illustrating an embodiment of a method for sharing a TPM.

The preferred embodiments of the present invention and the advantages thereof are best understood by referring to FIGS. 1-3 of the drawings, like numerals being used for like and corresponding parts of the various drawings.

FIG. 1 is a block diagram illustrating an embodiment of a system 1 for sharing a trusted platform module (TPM). In the embodiment illustrated in FIG. 1, system 1 comprises computer system 10 having a motherboard 100 which holds a central processing unit (CPU) 110, a memory 120, a TPM 130, firmware 140, and a circuit 150. In the embodiment illustrated in FIG. 1, firmware 140 comprises a basic input/output system (BIOS) 140. Circuit 150 may be any circuit or device on motherboard 100, including, without limitation, another security device, an embedded device, a platform extension, an interface or a bus controller. BIOS 140 is firmware that runs on computer system 10 before an operating system (OS) 121 is loaded and executed. However, it should be understood that other methods and/or embodiments of computer system 10 may be employed that do not incorporate a traditional BIOS but instead use other firmware systems. Computer system 10 may comprise any type of computing system such as, but not limited to, a personal computer, a personal data assistant (PDA), a microcontroller, an embedded system, a communication device and an entertainment device. As used herein, the term "TPM" comprises any device providing a basis for hardware-enabled trusted computing, and is not limited to devices meeting the specifications produced by the Trusted Computing Group (TCG).

In FIG. 1, TPM 130 comprises a TPM busy flag 131 (indicating that TPM 130 is being used or is presently executing a process and/or request issued from a system locality entity (SLE)) and a request flag 132 (indicating a request for use of TPM 130 to execute a system locality process and/or a request issued from a SLE). A SLE is an entity that is allowed access to restricted TPM internal cryptographic functionalities and adheres to TPM restrictions of not exposing the TPM internal cryptographic capabilities to a user or an application for general use. A SLE can be any component that adheres to these constraints and may include platform firmware (e.g., firmware 140), a BIOS (e.g., BIOS 141), other chips on motherboard 100, peripheral devices such as a keyboard, fingerprint readers, etc. A SLE thus extends the internal cryptographic functions of a TPM to a logical boundary that excludes general purpose applications and users. A SLE proves its "locality" using either a hardware signal that cannot be spoofed by a rogue OS, or by communicating with the TPM on the designated memory mapped input/output (MMIO) range for that locality. Further, it should be understood that a SLE can be physical or virtual, such as a Hypervisor/Virtual Machine Monitor.

In the embodiment illustrated in FIG. 1, computer system 10 also comprises an add-in device 101, which may be a plug-in card, a media reader, a security device, or any other type of device which may be used with computer system 10. In FIG. 1, a smart card 11, a universal serial bus (USB) device 12, and a security device 13 are illustrated as being communicatively coupled to computer system 10. Security device 13 may comprise any type or security-related device such as, but not limited to, a biometric device such as a fingerprint reader or retina scanner. In system 1 illustrated in FIG. 1, one or more SLE entities (e.g., one or more of smart card 11, USB device 12, security device 13, add-in device 101, firmware 140, BIOS 141, circuit 150, etc.) may use and/or otherwise request services from TPM 130. In operation, to use and/or otherwise request services of TPM 130, request flag 132 is set or a notice is sent through OS 121, which is processed by CPU 110 and is stored, at least temporarily, in memory 120.

In some embodiments, request flag 132 may be set or cleared by sending a general purpose input/output (GPIO) message through a system bus to TPM 130 and using MMIO. MMIO uses the same bus to access both memory and input/output (I/O) devices so that some memory addresses are reserved for I/O rather than accessing memory space. The TCG specification defines memory ranges for different localities. The TPM 130 is assured that the entity communicating to it is at a given locality based on the memory range that entity used to communicate with TPM 130.

FIG. 2 is a block diagram further illustrating system 1 of FIG. 1. In the embodiment illustrated in FIG. 2, computing system 10 comprises a user process layer 21, a system process layer 22, a kernel mode layer 23, and a firmware/hardware layer 24. OS 121 extends from user process layer 21, through system process layer 22 and into kernel model layer 23. User process layer 21 comprises two applications 211 and 212 which desire use of security functionality of TPM 130. For example, applications 211 and 212 may require encryption or decryption in order to process data, such as may be required to play audio files or digital video discs (DVDs). It should be understood that the types and quantities of applications or other entities desiring to use the resources of TPM 130 may vary.

At an OS level (e.g., controlled by and/or otherwise performed under OS 121 control within layers 21, 22 and 23), in order to obtain and/or otherwise access the desired security functionality of TPM 130, one of applications 211 and 212 initiates the execution of a process on TPM 130. Applications 211 and 212 interface with TPM 130 through a TCG software stack (TSS) 221. TSS 221 accesses a TPM device driver library (TDDL) or TPM Basic Services (TBS) 222. TSS 221 and TDDL/TBS 222 are disposed in system process layer 22, which is below user process layer 23. TDDL/TBS 222 selects a particular TPM device driver 231 to drive TPM 130 using an input/output (I/O) system 232. I/O system 232 may comprise, without limitation, a GPIO or MMIO.

User process layer 21, system process layer 22, kernel mode layer 23 and firmware/hardware layer 24 represent different degrees of access to resources, with higher layers having a greater degree of access. For example, a user(s) of computer system 10 may install, patch and delete many applications in user process layer 21, such as the applications 211 and 212, over the course of computer system 10's lifetime. However, in some embodiments, TPM 130 is tamper-resistant and unchangeable by a user. Generally, any applications, such as applications 211 and 212, that run under the control of OS 121 may be subject to an attack, possibly by a user, hacker or virus. For example, attacks may include attempts to gain improper access to data in order to copy it or corrupt it. Thus, by moving security services outside OS 121, where access is more limited, multiple forms of computer attacks may be precluded.

SLE 234 comprises any type of device that may be disposed in firmware/hardware layer 24, and thus may potentially provide a higher level of security than that provided by applications 211 and 212 disposed in user application layer 21. In some embodiments, SLE 234 may comprise one or more of smart card 11, USB device 12, security device 13, add-in device 101, firmware 140, BIOS 141 or circuit 150 (FIG. 1). However, it should be understood that other types of applications and/or entities may reside in firmware/hardware layer 24 and comprise an SLE 234.

SLE 234 is configured to interrupt the OS 121-level process executing on TPM 130 for the using application 211 or 212 by either setting request flag 132 or by sending another type of notice. For example, a notice may be sent to TPM 130, TSS 221, TBS 222, application 211 or 212, or any other entity in OS 121. Request flag 132 may be set using the I/O system 232, or by going through OS 121. Notice may also be passed to TPM 130 through I/O system 232 or to OS 121 for routing to the proper recipient, possibly using WMI. Thus, the OS 121-level process is interrupted and/or paused to enable execution of a non-OS 121-level process (e.g., a process associated with SLE 234 and/or otherwise issued by an entity external and/or outside layers 21, 22 and 23 of OS 121) by TPM 130.

When TPM 130 is executing an OS 121-level process and/or request for an OS 121-level application (e.g., for applications 211 and/or 212 under the control of OS 121), TPM busy flag 131 indicating that TPM 130 is being used is not set. Since the TCG TPM specifications provide for a single-process, single-user device, if TPM 130 meets the TCG specification, the current process has exclusive use of TPM 130. Embodiments of system 1 use request flag 132 to provide at least one mechanism for enabling sharing of TPM 130 by signaling a request by SLE 234 (such as one of smart card 11, USB device 12, security device 13, add-in device 101, firmware 140, or circuit 150), to interrupt or pause execution of the OS 121-level process and execute a SLE 234 process.

FIG. 3 is a flow diagram illustrating an embodiment of a TPM sharing method. The method begins at block 301, where TSS 221 executes an OS 121-level process on TPM 130 (e.g., on behalf of application 211 or 212). Although FIG. 3 is described using TSS 221, other entities could be using TPM 130, such as a TDDL/TBS 222 or another OS 121-level application that has access to TPM 130 resources. At block 302, it is indicated that SLE 234 desires to use TPM 130 (e.g., firmware 140, BIOS 141, circuit 150, another circuit on motherboard 100, a device external to motherboard 100 and/or any other SLE that is authorized to use TPM 130). As discussed above, this request could be for an encryption or decryption process that is to be performed outside OS 121.

At block 303, SLE 234 authenticates itself to TPM 130 to obtain authorization to use TPM 130. For example, authentication may require sending a message using the predefined locality memory range via MMIO. At block 304, SLE 140 requests use of TPM 130 by, for example, setting request flag 132 and/or sending a notification using WMI, GPIO, MMIO, or any other method enabling SLE 234 to signal either TPM 130 or a process executing in OS 121. It should also be understood that other methods may also be used (e.g., using an interrupt request (IRQ)).

At block 305, TSS 221 becomes aware of the SLE 234 request by monitoring request flag 132 status or by otherwise receiving notification of the SLE 234 request. The hand-off of control of TPM 130 from TSS 221 to SLE 234 may be performed cooperatively or preemptively. At decision block 306, SLE 234 proceeds with either a cooperative or preemptive approach. If a preemptive approach is selected, the method proceeds to block 307a, where SLE 234 pauses execution of the TSS 221 process and saves the state of TPM 130 and the method proceeds to block 310. If at decision block 306 a cooperative approach is selected, the method proceeds to block 307b, where TSS 221 begins a clean up process while SLE 234 waits. For example, in some embodiments, using the cooperative approach, TSS 221 pauses its own process, saves the TPM 130 state, and then clears request flag 132. At decision block 308, a determination is made whether TSS 221 has finished the clean up process by monitoring the status of request flag 132. If TSS 221 has not yet finished, the method proceeds to block 309 where SLE 234 continues monitoring the status of TSS 221 to determine whether TSS 221 has finished by monitoring request flag 132. It should be understood that in some embodiments, system 1 may be implemented to use preemption for all devices, cooperation for all devices, or use cooperation for certain devices and preemption for other devices (e.g., set by a system designer, user, administrator, etc.). In other embodiments, the determination of whether to perform a cooperative or preemptive process is based on a priority of the task (e.g., a higher priority task using a preemptive process and a lower priority task using a cooperative process). When implemented in accordance with TCG specifications, TPM 130 is able to respond to SaveState( ) and RestoreState( ) commands in order to save and restore its register values, respectively. Either TSS 221 or SLE 234, whichever has control of TPM 130, is able to issue such commands.

When TSS 221 has released control of TPM 130, TSS 221 signals the release (e.g., by clearing request flag 132 and/or reporting status to applications in OS 121 which have been using TSS 221 to access TPM 130 functionality) at block 310. In some embodiments, TSS 221 reports that it has been preempted or provide a time estimate for completing the process, which includes time that SLE 234 will be using TPM 130. At block 311, SLE 234 accesses and/or otherwise takes control of TPM 130 and sets busy flag 131. At block 312, SLE 234 executes its own process and, upon its conclusion or completion, releases TPM 130 at block 313. In some embodiments, releasing TPM 130 includes cleaning up the firmware 140 process, clearing busy flag 131, restoring the state from the TSS 221 process, and notifying TSS 221.

At block 314, TSS 221 reconnects to TPM 130. In some embodiments, the reconnection to TPM 130 occurs in response to TSS 221 receiving a notification that the process associated with SLE 234 is completed or as a result of TSS 221 monitoring busy flag 131. In some embodiments, TPM 130 and/or applications in OS 121 that have been using TSS 21 to access TPM 130 are otherwise notified that the process for SLE 234 is completed to ensure that TPM 130 use returns to TSS 221 to facilitate completion of the process for TSS 221. If the TPM 130 state that was saved was not restored by SLE 234, TSS 221 restores the TPM 130 state. The execution of the TSS 221 process is resumed at block 315.

Thus, embodiments of system 1 enable shared use of TPM 130 resources such that control of TPM 130 may be relinquished before completion of an OS-level process by TPM 130. In some embodiments, system 1 enables a preemptive and/or cooperative approach to sharing TPM 130 resources.

What is claimed is:

1. A method for sharing a trusted platform module, comprising:
   executing an operating system (OS)-level process by a trusted platform module (TPM);
   receiving, through the OS, a request for use of the TPM by a non-OS-level process;
   pausing execution of the OS-level process by the TPM; and
   after pausing execution of the OS-level process, executing, by the TPM, the non-OS-level process,
   wherein executing the non-OS-level process comprises executing a non-OS-level process associated with a system locality entity (SLE) communicating with the TPM on a designated memory mapped input/output (MMIO) range for the SLE.

2. The method of claim 1, further comprising, after executing the non-OS-level process, resuming execution of the OS-level process by the TPM.

3. The method of claim 1, further comprising, with pausing execution of the OS-level process, saving a state of the TPM.

4. The method of claim 1, further comprising, with pausing execution of the OS-level process, saving, by the SLE, a state of the TPM.

5. The method of claim 1, further comprising, after executing the non-OS-level process, restoring a state of the TPM.

6. The method of claim 1, further comprising setting a flag to indicate the request for use of the TPM to execute the non-OS-level process.

7. The method of claim 1, further comprising monitoring a flag set to indicate the request for use of the TPM for the non-OS-level process.

8. The method of claim 1, further comprising sending a notice to the OS to indicate the request for use of the TPM to execute the non-OS-level process.

9. The method of claim 1, wherein pausing comprises preemptively pausing execution of the OS-level process.

10. The method of claim 1, wherein pausing comprises cooperatively pausing execution of the OS-level process.

11. The method of claim 1, wherein executing the non-OS-level process comprises executing the non-OS-level process outside the OS.

12. The method of claim 1, further comprising, before executing the non-OS-level process, authenticating to the TPM use of the TPM by the non-OS-level process.

13. The method of claim 1, further comprising, with pausing execution of the OS-level process, providing a time estimate for completing the non-OS-level process by the TPM.

14. A system for sharing a trusted platform module, comprising:
   a computer system; and
   a trusted platform module (TPM) operable on the computer system to execute an operating system (OS)-level process, the TPM operable to receive, through the OS, a request for use of the TPM by a non-OS-level process, pause the execution of the OS-level process, and execute the non-OS-level process after pause of the OS-level process,
   wherein the non-OS-level process is associated with a system locality entity (SLE) operable to communicate with the TPM on a designated memory mapped input/output (MMIO) range for the SLE.

15. The system of claim 14, wherein the SLE is operable to save a state of the TPM with pause of the OS-level process.

16. The system of claim 14, wherein the SLE is operable to restore a state of the TPM after execution of the non-OS-level process.

17. The system of claim 14, wherein the TPM comprises a request flag for indicating the request to execute the non-OS-level process.

18. The system of claim 14, wherein the OS is operable to receive a notification requesting use of the TPM to execute the non-OS-level process.

19. The system of claim 14, wherein the TPM is operable to execute the non-OS-level process outside the OS.

20. The system of claim 14, wherein use of the TPM by the non-OS-level process is authenticated to the TPM before execution of the non-OS-level process.

21. The system of claim 14, wherein a time estimate is provided for use of the TPM by the non-OS-level process.

22. A system for sharing a trusted platform module, comprising:
   a computer system;
   a trusted platform module (TPM) operable on the computer system to execute an operating system (OS)-level process, the TPM operable to receive, through the OS, a request for use of the TPM by a non-OS-level process, pause the execution of the OS-level process, and execute the non-OS-level process after pause of the OS-level process; and
   a system locality entity (SLE) operable to set a request flag indicating the request to execute the non-OS-level process, and communicate with the TPM on a designated memory mapped input/output (MMIO) range for the SLE.

* * * * *